June 19, 1928.  W. DE WASMUNDT  1,673,968
MOTOR WITHOUT CRANK SHAFT
Filed Sept. 22, 1922   6 Sheets-Sheet 1

Inventor:
W. de Wasmundt
By
Lawrence Langner
Atty

June 19, 1928.

W. DE WASMUNDT 1,673,968

MOTOR WITHOUT CRANK SHAFT

Filed Sept. 22, 1922      6 Sheets-Sheet 2

Inventor
W. de Wasmundt
by
Lawrence Langner, Atty.

June 19, 1928.

W. DE WASMUNDT 1,673,968

MOTOR WITHOUT CRANK SHAFT

Filed Sept. 22, 1922

Inventor:
W. de Wasmundt
By
Lawrence Langner
Atty

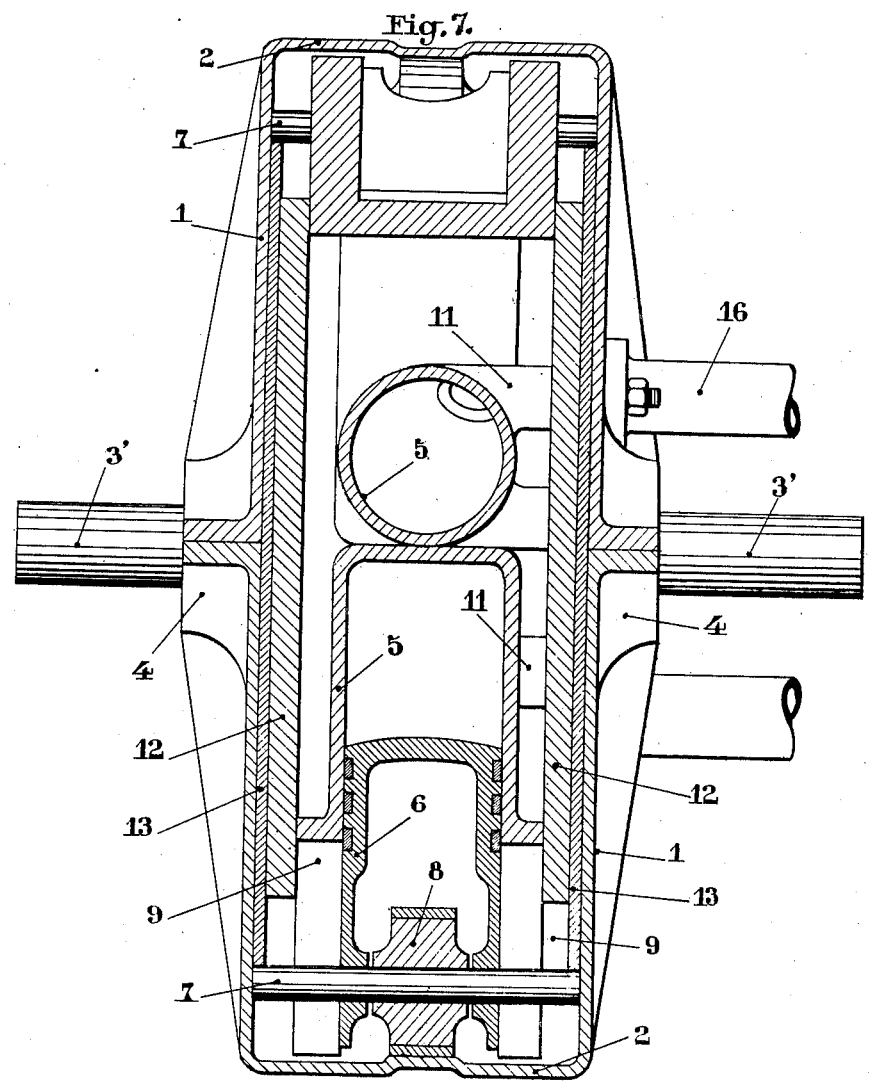

Patented June 19, 1928.

1,673,968

UNITED STATES PATENT OFFICE.

WLADIMIR DE WASMUNDT, OF PARIS, FRANCE.

MOTOR WITHOUT CRANK SHAFT.

Application filed September 22, 1922, Serial No. 589,910, and in France October 12, 1921.

The object of the present invention is a motor in which the rectilinear alternations of a piston are changed into rotary movement of the motor, not by the action of a connecting rod in the crank shaft, as in the usual arrangement, but by the action of a closed surface of suitable shape, upon which the piston or pistons are continuously supported.

It aims at a particular formation of the bearing surface for the pistons which makes it possible to obtain all the desirable combinations of connection from the exhaust stroke to the driving stroke, by means of displacements with reference to a fixed point of the casing forming the bearing surface, by following any suitable direction from the center through which passes the axis of a drum containing the cylinders, or by means of a bearing surface of especial form.

The invention also aims at arrangements for crankless motors constructed and operated in such a manner as to avoid the usual defects of motors of this type. The chief defect is the unsatisfactory output, caused by exaggerated friction for some types or by the sudden angle of advance of the piston rollers on the bearing surface, for other types.

In the accompanying drawings:—

Fig. 7 is a section on line 1—1 of Fig. 6;

Crankless motors in general are well known and have been used in many different ways.

One of the general methods applied in the present invention, and of which it is one of the fundamental characteristics, is to suppress, during the drive stroke of the piston, the harmful tangential component by arranging the form of the corresponding part of the bearing surface as a cylinder having for its base an involute arc of a circle, or using some similar surface.

In the case of the involute (see Fig. 1), the tangents of circle A will all be normal to the bearing surface. In practice, considering the difficulty of obtaining this surface, it can be replaced by a similar surface formed by a set of portions of cylinders with circular bases the axes of which pass through intersection points of a set of tangents to circle A of Fig. 1, these tangents corresponding to the lines M—F, that is to say, to the successive positions of the axis of the piston.

Figure 1:
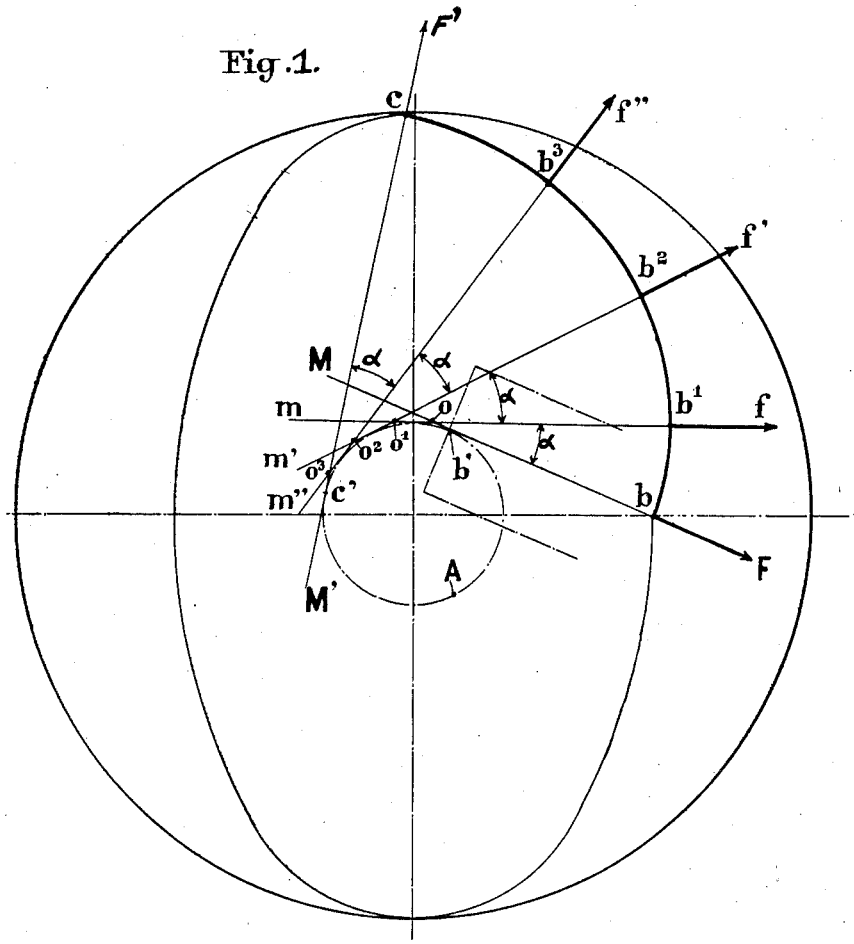
Fig. 1 shows the general method for constructing a piston bearing surface according to this invention.

Figure 1 illustrates, by a right section, the method of construction of the surface in question (section $b\,c$ of the bearing surface). In this example the section $b\,c$ is formed by the succession of four arcs of circles, but in practice this number can be much larger in order to obtain as continuous a surface as possible. To construct the curve in question (right section of the bearing surface) the tangent M—F is drawn to the circle A, passing through point $b$ and the tangent M'—F' to the circle passing through $c$. The arc $b'\,c'$ included between the two points of tangent $b'$ and $c'$ in the circle A is divided into a number of equal arcs (4 in the example of Fig. 1) and the tangents are drawn to the circle A passing through the points of division thus obtained. These tangents are indicated on Fig. 1, at $m\,f, m'\,f', m''\,f''$. The various tangents are cut again at $o, o^1, o^2, o^3$.

From the point $o$ as a center, and with a radius equal to $o\,b$, a circular arc $b\,b'$ is drawn, and then the same is done with $o^1$, as a center and with a radius $o^1\,b^1$, then $o^2$ taken as a center and with a radius $o^2\,b^2$, and finally $o^3$ taken as a center and with a radius $o^3\,b^3$. Thus is obtained a curve $b\,b^1\,b^3\,b^2\,c$ formed of a series of arcs of circles, this curve showing the bearing surface for the piston during this part of the stroke. It will be noticed that in each of the portions of curve $b\,b^1$, $b^1\,b^2 \ldots b^3\,c$, the axis of the piston remains constantly normal to the bearing surface, by construction. The result is that the force is not decomposable and that the injurious tangential component is suppressed.

With the construction method of Fig. 1 the bearing surface presents in $b$ (and eventually in $b'$) a sharp change of direction which might be harmful to the correct operation of the motor. This defect can be avoided by the forms of construction of Figs. 2 and 3. In this case the lower part $e\ f$ of the bearing curve (in the form of an arc of a circle) is attached to the special curve $b\ c$ by a straight line $f\ b$ (or preferably in practice by a nearly straight line), tangent at $f$ to the circle of which the arc $e\ f$ forms a part.

Figure 2:
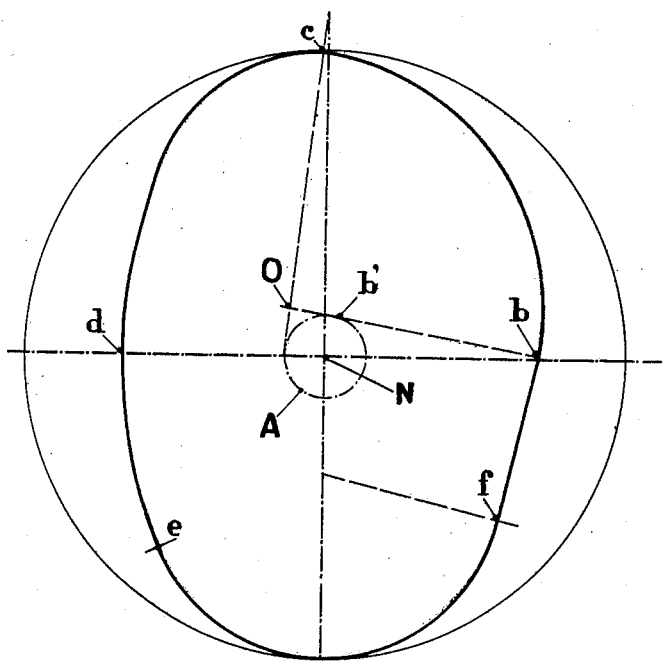
Figs. 2 and 3 show further application of the principle according to Fig. 1.

Figure 2 shows a difference in the construction of the curve $b\ c$, consisting in a simplification and an approximate solution of the problem. Conformably with this alternative the curve $b\ c$ is formed by an arc of a single circle having its centre at O.

Figure 4:
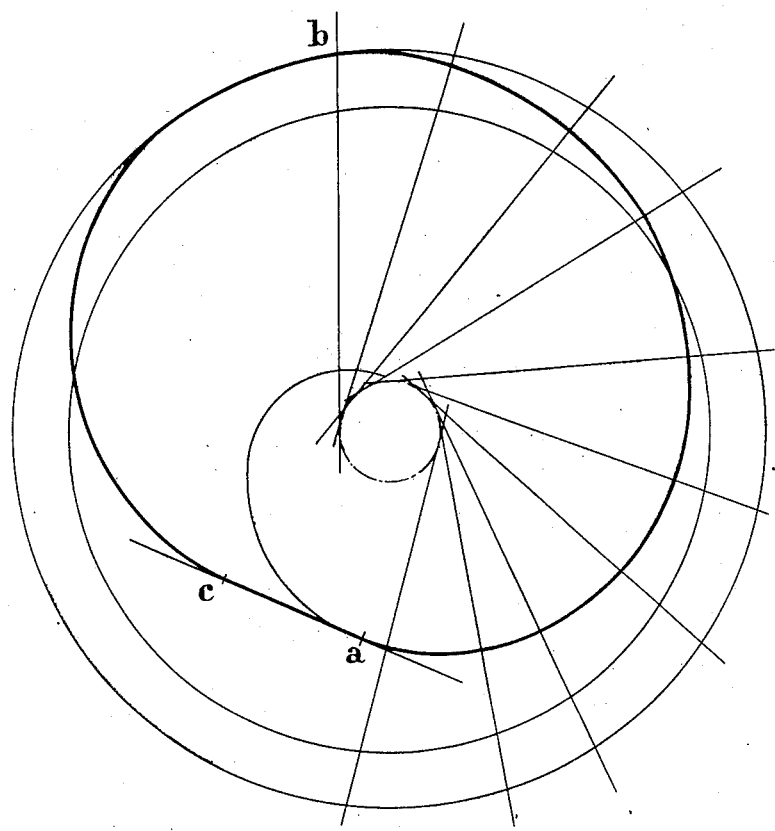
Fig. 4, shows another form of alternative, consisting in the exact mathematical solution of the problem.

Fig. 4, on the contrary, shows another form of alternative, consisting in the exact mathematical solution of the problem. In the figure, the portion $a\ b$ is formed by an involute arc of a circle, the portion $b\ c$ by an arc of a circle, and the portion $c\ a$ by a tangent common to the arc of circle $b\ c$ and to the involute arc $a\ b$.

It goes without saying that, for facilitating the construction, the involute arc $a\ b$ can be replaced by any sort of spiral arc resembling the form of the involute circle.

Another characteristic of the invention, the application of which allows for the modification of the respective values of the piston strokes for the different strokes of a four stroke cycle, consists in displacing the center of the drum 5 with reference to a fixed point of the casing C, or vice versa, or in giving a suitably adjusted form to the bearing surface in order to produce the aforesaid variations.

Figure 3:
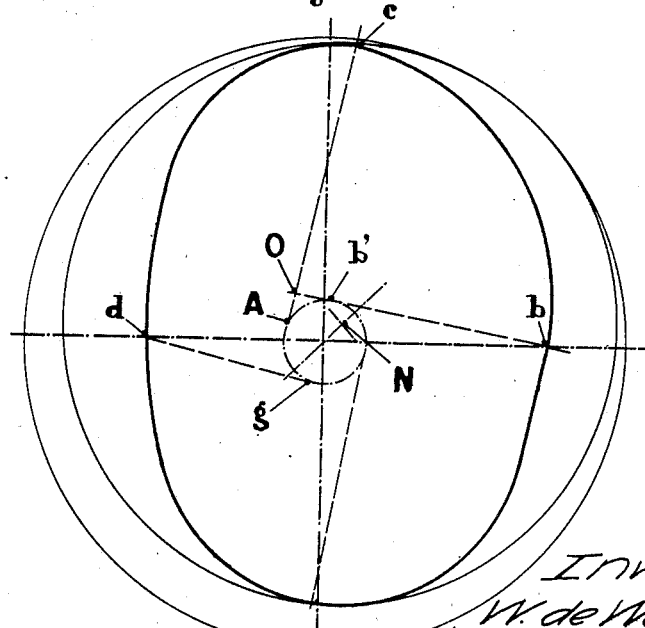

Figure 3 is similar to Fig. 1, showing, as an example only, a curve, suitably adjusted for obtaining the aforesaid results.

Figure 5:
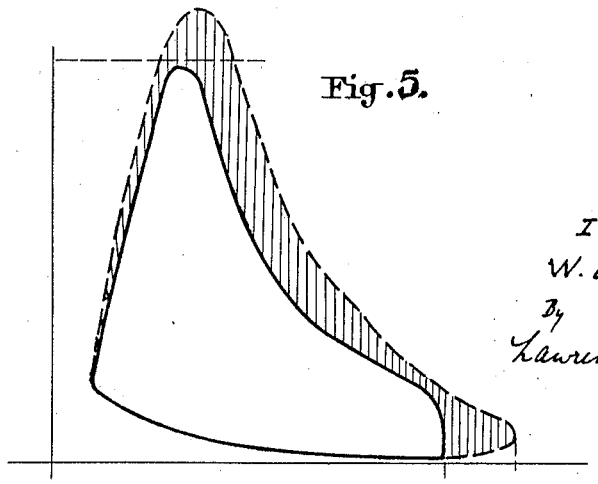
Fig. 5 is a diagram showing the gain in work due to the invention.

Fig. 5 is a diagram showing, very closely, by the hatched area, the amount of work which can be gained by the application of the method in question.

In the curve of Fig. 3 the center is displaced in such a way as to obtain the various effects mentioned above: i. e. prolongation of the expansion stroke, complete evacuation of the gases.

Figs. 6–9 represent the developed plans for motors constructed in conformity with the invention, the latter being applied, as an example, to motors of different types.

Figure 6:
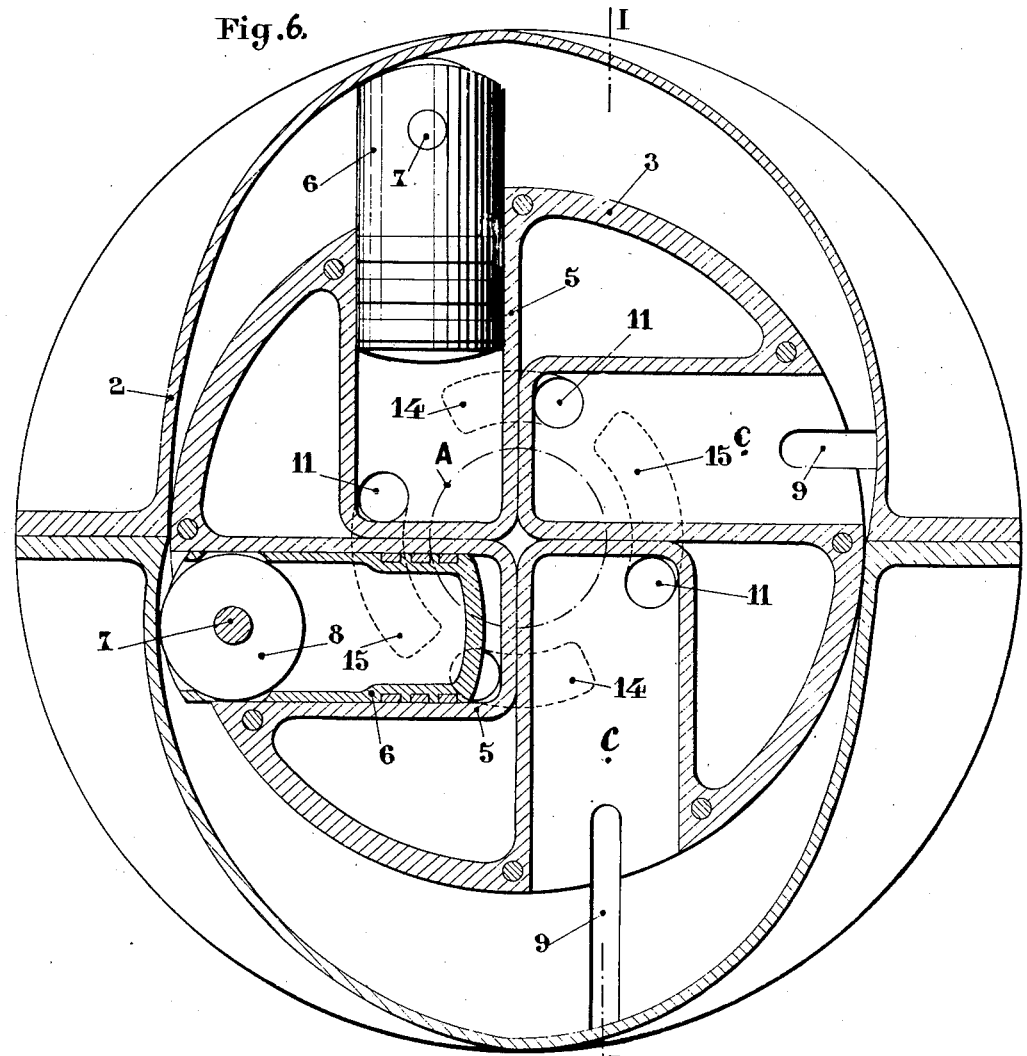
Fig. 6 is a vertical section of a motor according to this invention.

Fig. 6 is a section perpendicular to the axis of the motor, the pistons of which are supported during their stroke on a surface of right section, generally oval, but rectified in conformity with Fig. 3.

Figure 8:
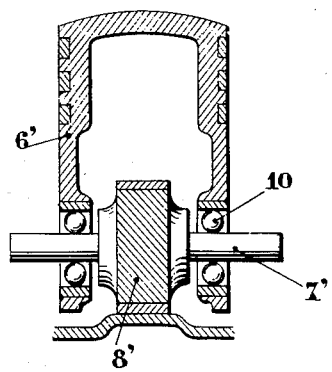
Fig. 8 shows a modified form of piston support means.

Fig. 7 is a section taken on line 1—1 of Fig. 8.

Fig. 8 is a detailed view showing a section, taken through the axis of the piston, a variation of the bearing arrangement of the piston on the guide surface.

Figure 9:
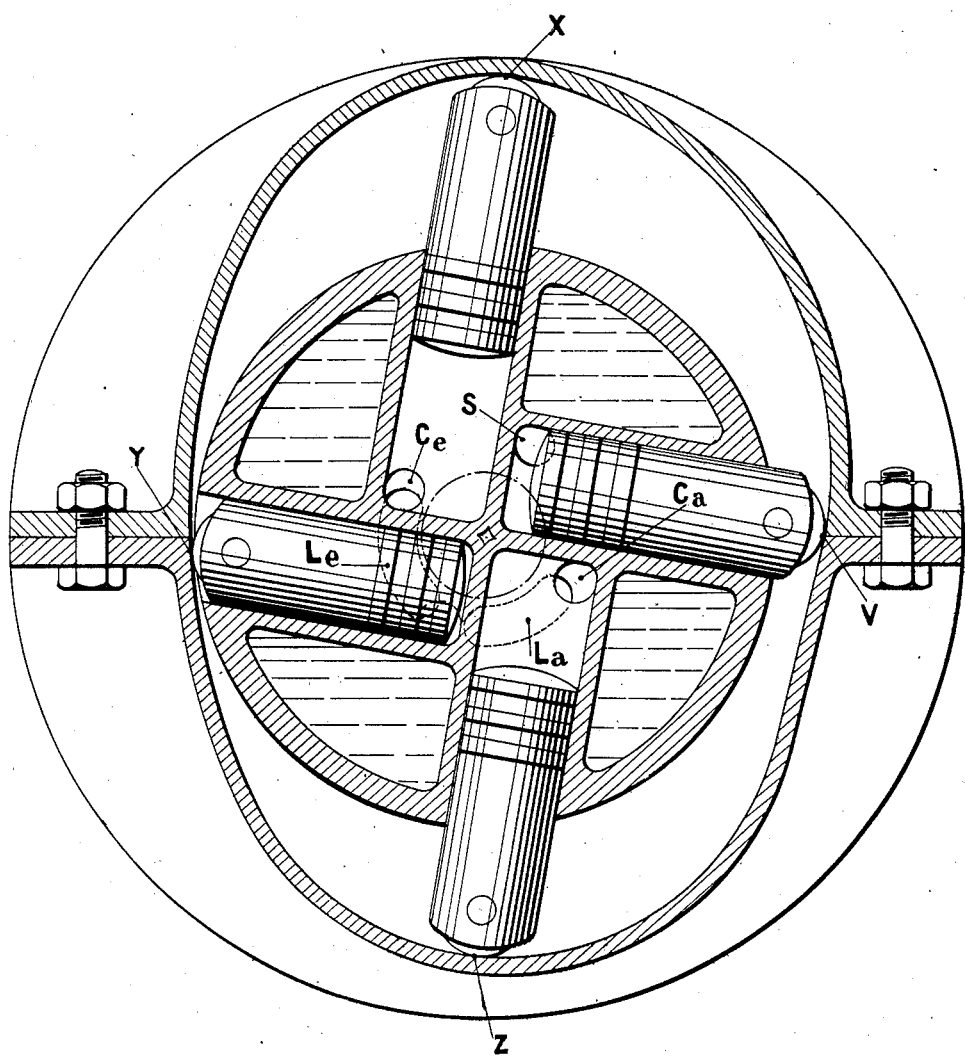
Fig. 9 is a vertical section at right angles to the motor axis of a motor of the general form of Figs. 2 and 3.

Fig. 9 is a section, perpendicular to the axis of the motor, and similar to that of Fig. 6, but in which the bearing surface is constructed according to Fig. 3.

It is at once seen that, in these various examples of the application of the invention, the centrifugal force to which the pistons are submitted during their rotation around the axis of the motor, causes them to vigorously press against the bearing surface, and to thus maintain between the said pistons and the said surface, a continuous contact, thus avoiding shocks which occur in the motors of ordinary types.

The motors of Figs. 6 and 7 have a casing in the form of a flat drum formed by two discs 1 joined by a member 2 of which the interior surface presents the particular shape of any one of Figs. 2–4. This interior surface serves as a guide and bearing surface for the pistons.

In side drum 1, is placed a second drum 3 of the usual cylindrical shape keyed to the driving shaft 3' which projects from the exterior of the casing and turns in suitable bearings 4 formed on the latter.

In the drum 3 are placed the cylinders 5, arranged in preferences, as shown in Fig. 6. The axes of these cylinders are tangent, in all the positions of the drum, to the circumference of circle A, the centre of which is on the axis of the driving shaft. In each of the cylinders 5 moves a piston 6 bearing, close to its external extremity, a journal 7 which serves as an axis for the roller 8 by means of which the piston is supported on the guide surface. The journals 7 of the pistons enter into the mortises 9 cut into the cheeks of the drum 3, and these mortises serve as guides for the journals 7 during the rectilinear displacements of the pistons.

The rollers 8 can be fitted with balls on their journals 7. When the rotation speed of the motor is very great, these balls turn at an excessive speed. To reduce this speed the arrangement represented in Fig. 8 can be used. In this case the roller 8' and the journal 7' are formed in a single piece and the ball bearings 10 are placed in the casing of the piston 6', which is suitably reinforced for this purpose. This arrangement enables the use of balls whose diameter is relatively larger in proportion to the diameter of the journal 7', and consequently allows for a sufficiently reduced rotation speed for the said balls.

A motor of this construction can operate as a two stroke combustion engine, as a steam engine, or as a motor operating on fluid under pressure.

In the case of a steam engine, the arrangement of the distribution can be as is shown in a schematic manner in Figures 6 and 7. A channel 11 is provided in the head of each cylinder, which channels go through the brackets 12 of the drum, and this channel serves for the admission and for the escape of the steam.

The brackets 12 are supported during the operation of the motor, on members 13 fixed to the interior of the cheeks 1 of the casing. In one of the members 13, on the side of the orifice of pipes 11, two ports 14 are pierced, for the entry of the steam, and two ports 15 for its escape and these ports register with the pipes 16 for entry and escape of steam.

The members 13 form, at their periphery, a guide surface for the journals 7 of the pistons. These latter are thus securely held, both by the exterior surface of the members 13, by means of the journals 7, and by the exterior bearing surface, by means of the rollers 8, at the same time.

The operation of this kind of motor actuated by steam is as follows.

Steam is conducted by pipes 16, and enters into the two cylinders through the ports 14 at the same time. The pressure upon the pistons and the bottom of the cylinders, produces a displacement of the pistons, the strain along the axis of the cylinder, and onto the bottom of the piston, having a tangential resultant which causes rotation of the drum 3 with the cylinders. During this rotation, the rollers 8 of the piston turn on the guide surface 2. When the drum has effected a fraction of a revolution, suitably selected, the steam admission ports are closed and the steam pressure contained in the two first cylinders lessens in continuing to exercise a driving force on the bottom of the cylinders. During the following quarter of a revolution, the orifices of the pipes 11 of the two cylinders in question, coincide with the ports 15 and the steam can escape up to the moment when the aforesaid ports again coincide with the steam admission ports.

It goes without saying that the same operation follows in the other two cylinders of the motor.

The same construction applies to a combustion motor which operates at two strokes, depending on the position of the distribution ports and the ignition. A rotary motor constructed as just described, gives, with an equal number of cylinders, twice the power that an ordinary motor supplies. It can also, in giving the same power as an ordinary motor, revolve at a speed one half as great, which is particularly advantageous in certain cases.

As has been fully explained above, the guide and bearing surface of the pistons can present a suitable form to produce a variation in the length of the piston stroke.

What I claim is:

1. A crankless motor comprising, a drum, a power shaft on the drum, at least one cylinder in the drum, a piston in the cylinder, a closed guide surface receiving the thrust of the piston and formed to give different lengths of stroke to the piston during a single cycle of operation, the axis of the cylinder being offset from the axis of the drive shaft so as to be always tangent during movement of the cylinder to a circle concentric with the drive shaft, that part of the guide surface receiving the thrust of the piston during its power stroke, being in transverse section, an arc of a circle having its center at the intersection of two lines drawn from the extremities of the said part of the surface, and at right angles to the surface, and tangent to the said circle concentric with the drive shaft.

2. A crankless motor, comprising, at least one cylinder, a closed guide surface, a piston in the cylinder bearing against the guide surface during its various strokes throughout the cycle of operation, the cylinder being positioned so that its axis during rotation is always tangent to a circle, that part of the bearing surface corresponding to the power stroke of the piston being an arc of a single circle having its center at the point of intersection of two straight lines passing respectively through the limiting points of said part of the surface and being tangent to said circle.

In testimony whereof, I have signed my name to this specification.

WLADIMIR DE WASMUNDT.